US009081891B2

(12) United States Patent
Chang et al.

(10) Patent No.: US 9,081,891 B2
(45) Date of Patent: Jul. 14, 2015

(54) RECONFIGURABLE CROSSBAR NETWORKS

(75) Inventors: Jichuan Chang, Sunnyvale, CA (US);
Parthasarathy Ranganathan, San Jose, CA (US); Kevin T. Lim, La Honda, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 229 days.

(21) Appl. No.: 13/563,074

(22) Filed: Jul. 31, 2012

(65) Prior Publication Data

US 2014/0040528 A1 Feb. 6, 2014

(51) Int. Cl.
| | |
|---|---|
| G06F 13/36 | (2006.01) |
| G06F 13/40 | (2006.01) |
| G06F 13/14 | (2006.01) |
| G06F 13/38 | (2006.01) |
| G06F 13/00 | (2006.01) |
| H04L 12/06 | (2006.01) |

(52) U.S. Cl.
CPC .............. *G06F 13/36* (2013.01); *G06F 13/14* (2013.01); *G06F 13/38* (2013.01); *G06F 13/40* (2013.01); *G06F 13/4022* (2013.01)

(58) Field of Classification Search
CPC ......... G06F 13/36; G06F 13/00; G06F 14/14; G06F 13/38; H04L 12/56
USPC ................................................. 710/316, 317
See application file for complete search history.

(56) References Cited

U.S. PATENT DOCUMENTS

| | | | | |
|---|---|---|---|---|
| 5,748,629 | A * | 5/1998 | Caldara et al. ............ | 370/389 |
| 7,292,580 | B2 | 11/2007 | Ramamurthy et al. | |
| 7,568,063 | B2 * | 7/2009 | Gostin et al. ............. | 710/317 |
| 7,603,508 | B2 * | 10/2009 | Rankin et al. ............ | 710/317 |
| 7,680,097 | B1 | 3/2010 | Goldstein et al. | |
| 7,782,849 | B2 * | 8/2010 | Clem et al. .............. | 370/389 |
| 7,802,049 | B2 * | 9/2010 | Levy ........................ | 710/316 |
| 7,848,251 | B2 * | 12/2010 | Jones et al. .............. | 370/252 |
| 7,961,745 | B2 | 6/2011 | Jensen | |
| 8,014,288 | B1 | 9/2011 | MacAdam | |
| 8,359,421 | B2 * | 1/2013 | Wang et al. .............. | 710/317 |
| 8,375,395 | B2 * | 2/2013 | Prasanna et al. .......... | 718/105 |
| 2007/0200594 | A1 * | 8/2007 | Levi et al. ................ | 326/38 |

(Continued)

OTHER PUBLICATIONS

Mai, et al., "Smart Memories: A Modular Reconfigurable Architecture," Proceedings of the 27th Annual International Symposium on Computer Architecture, May 2000, vol. 28, Issue 2, 11 pages.

Freitas, et al., "Reconfigurable Crossbar Switch Architecture for Network Processors," IEEE International Symposium on Circuits and Systems, May 21-24, 2006, pp. 4042-4045.

(Continued)

*Primary Examiner* — Thomas J Cleary
*Assistant Examiner* — Christopher A Daley
(74) *Attorney, Agent, or Firm* — Brooks, Cameron & Huebsch, PLLC

(57) ABSTRACT

Reconfigurable crossbar networks, and devices, systems and methods, including hardware in the form of logic (e.g. application specific integrated circuits (ASICS)), and software in the form of machine readable instructions stored on machine readable media (e.g., flash, non-volatile memory, etc.), which implement the same, are provided. An example of a reconfigurable crossbar network includes a crossbar. A plurality of endpoints is coupled to the crossbar. The plurality of endpoints is grouped into regions at design time of the crossbar network. A plurality of regional interconnects are provided. Each regional interconnect connects a group of endpoints within a given region.

14 Claims, 6 Drawing Sheets

(56) References Cited

U.S. PATENT DOCUMENTS

| | | | |
|---|---|---|---|
| 2009/0063702 A1* | 3/2009 | Holst et al. | 709/238 |
| 2009/0201811 A1* | 8/2009 | Filsfils et al. | 370/235 |
| 2011/0035530 A1* | 2/2011 | Takagi et al. | 710/317 |
| 2012/0047310 A1* | 2/2012 | Satpathy et al. | 710/317 |
| 2012/0144336 A1* | 6/2012 | Pinter et al. | 715/772 |
| 2013/0086296 A1* | 4/2013 | Lakshmanamurthy et al. | 710/314 |
| 2014/0136687 A1* | 5/2014 | Patel et al. | 709/224 |

OTHER PUBLICATIONS

Kim, et al., "A Reconfigurable Crossbar Switch with Adaptive Bandwith Control for Networks-on-Chip," IEEE International Symposium on Circuits and Systems, 2005, May 23-26, 2005, vol. 3, pp. 2369-2372.

De Freitas, et al., "On the Design of Reconfigurable Crossbar Switch for Adaptable On-Chip Topologies in Programmable NoC Routers," Proceedings of the 19th ACM Great Lakes Symposium on Very-Large-Scale Integration, May 10-12, 2009, pp. 129-132.

* cited by examiner

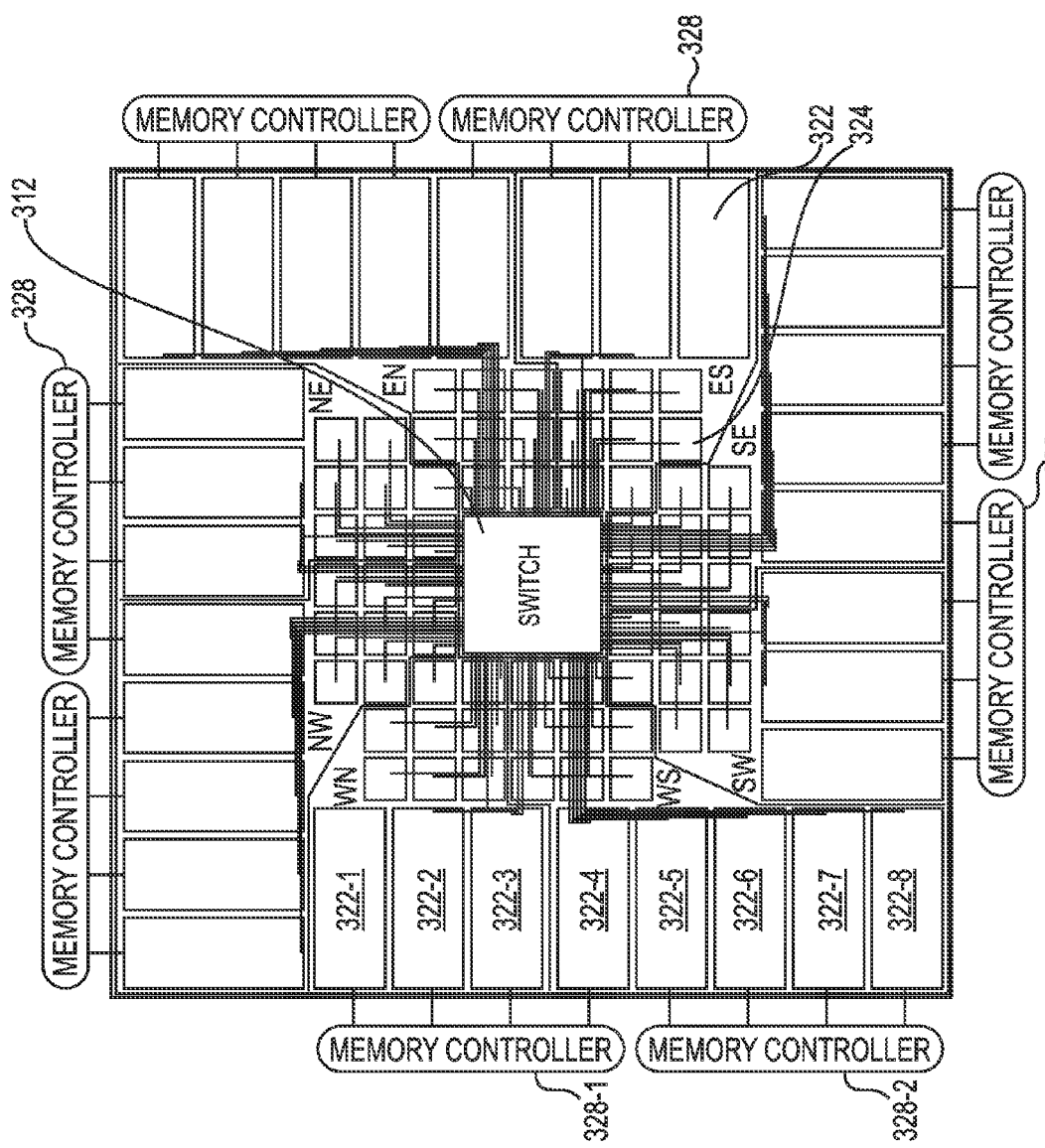
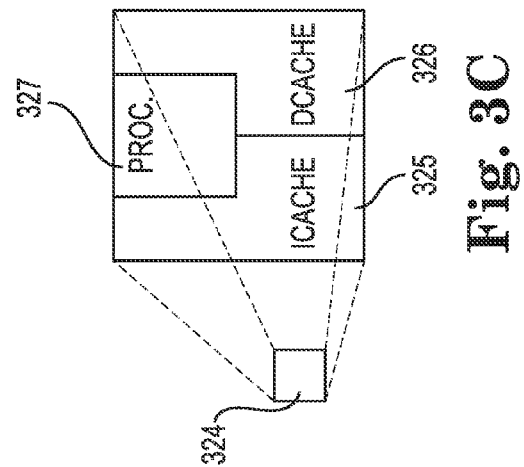
Fig. 3B
Fig. 3C

US 9,081,891 B2

RECONFIGURABLE CROSSBAR NETWORKS

BACKGROUND

Many systems can include multiple nodes within a computing machine, e.g., servers, or among computing machines. For example, a System-on-Chip (SoC) or Network-on-Chip (NoC) design may include multiple caches, processor cores, and/or input/output nodes (I/O) nodes connected via a crossbar network. A crossbar network provides a fixed route between two endpoints.

The fixed route network property can be a mismatch for workloads with heterogeneous bandwidth usage between endpoints. That is, crossbar networks are designed to provide a fixed bandwidth between two endpoints. Over-provisioning a bandwidth between two endpoints in a crossbar network can lead to high cost and under-utilized bandwidth. Under-provisioning a bandwidth between two endpoints in a crossbar network can lead to degraded performance.

BRIEF DESCRIPTION OF THE DRAWINGS

FIGS. 3A-3C illustrates in more detail an example embodiment of an "on-chip" based crossbar network according to the present disclosure.

DETAILED DESCRIPTION

Figure 1A:
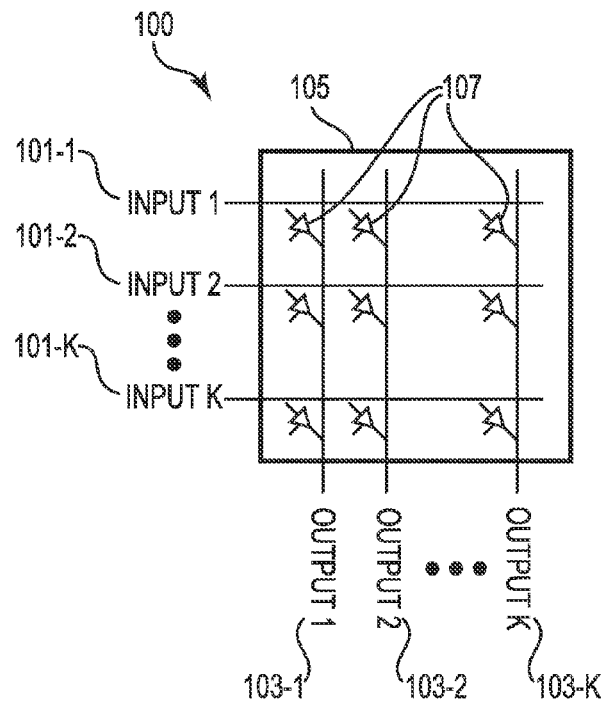
FIGS. 1A and 1B illustrate a baseline crossbar switch according to the prior art.

Embodiments of the present disclosure cover enhancements to crossbar networks that can include true crossbar networks and/or crossbar-like networks (e.g., "on-chip" and/or "off-chip") that can support static or dynamic reconfigurations, optionally in collaboration with adaptive thread placement/migration policies, to better match the workload's bandwidth requirements and traffic patterns. As mentioned above, crossbar networks provide a fixed path or route between two endpoints. With most crossbar networks the total bandwidth between any given two endpoints (e.g. processor cores or on-chip caches) are fixed and the total bi-section bandwidth is evenly distributed among endpoints.

Crossbar networks are employed for on-chip interconnections in Network-on-Chip (NoC) applications. The term "crossbar-like" is used herein to refer to a switch that is used to provide a fixed route, e.g., predetermined at design or install time, between two endpoints for "off-chip" interconnections. As used herein, the term "crossbar" generically includes both true crossbar switches and crossbar-like switches unless otherwise indicated.

The present disclosure addresses the abovementioned issues of over-provisioning and/or under-provisioning the bandwidth between two endpoints by allocating unused bandwidth from communication-light (low utilization) endpoints (e.g., "ants") to communication-heavy (high utilization) endpoints (e.g. "elephants"). Embodiments of the present invention are realized with high-bandwidth regional interconnects (e.g., local buses) that first transfer packets of a source elephant (e.g., communication-heavy, high utilization endpoint) to neighboring ants (e.g., communication-light, low utilization endpoints) which, on behalf of the source elephant, forward the packets to the neighboring ants of the target elephant. The packets eventually reach the target elephant via its regional interconnect.

In the case where multiple high utilization endpoints are competing for a shared regional interconnect bandwidth, based on a global communication pattern and regional resource availability, these high utilization endpoints can either be migrated apart to different regions each providing sufficient bandwidth to local high utilization endpoints or migrated closer to exploit shared regional interconnect and local caches.

Examples of the present disclosure include reconfigurable crossbar networks and devices, systems and methods, including hardware in the form of logic (e.g. application specific integrated circuits (ASICS)), and software in the form of machine readable instructions stored on machine readable media (e.g., flash, non-volatile memory, etc.), which implement the same. An example of a reconfigurable crossbar network includes a crossbar. A plurality of endpoints is coupled to the crossbar. The plurality of endpoints is grouped into regions at design time of the crossbar network. A plurality of regional interconnects are provided. Each regional interconnect connects a group of endpoints within a given region.

The regional and crossbar interconnects in the network are reconfigurable to support heterogeneous and dynamically changing traffic patterns. As used herein, the term "heterogeneous" is intended to mean "different" and the term "dynamic" is intended to mean "changeable over time".

Further, as intended herein, a crossbar network is different from a "load balancing" router or switch in an Internet and/or computing device network "mesh" in that a "load balancing router" (e.g., in a "mesh") allows for multiple "alternative" paths between any two endpoints. For example, there may be many alternative paths to traverse between a point "A" and a point "B" in a grid system, e.g., streets and avenues in a city grid system. Indeed, a municipal fire department uses such alternative paths according to traffic patterns between two locations. However, a "crossbar network", as know to those of skill in the art does not include alternative or redundant routes in order to reduce cost. In contrast, the routes through a crossbar are fixed at manufacturing and design time or at install in a crossbar-like datacenter, off-chip implementation. Hence only "one, single" route exist through a given crossbar between two particular endpoints, e.g., endpoint "A" and endpoint "B".

As described above, a crossbar network can provide a fixed bandwidth between any two pairs of endpoints. There may, however, be a subset of endpoints that have a much higher bandwidth need than the rest of the endpoints. The present disclosure provides a solution for heterogeneous and dynamic network communication conditions between different endpoints without over-provisioning the average bandwidth available in a crossbar network.

The present disclosure provides a solution by grouping endpoints into topological regions, at design time, e.g., by proximity, use and predicted interaction, and by adding higher bandwidth and lower cost (e.g., in terms of power and real-estate) regional interconnects to share the bandwidth available within each region. Adding regional interconnects not only supports bandwidth high utilization endpoints without over-provisioning the crossbar network, but also provides flexibility for process scheduling because the high utilization endpoints can be placed dynamically, at "run time" based on the bandwidth demand and supply at both regional, e.g., "local", and system, e.g., "global", levels.

In one example, a "local" interconnect is intended to include a regional interconnect between endpoints in a given region in connection with an on "on-chip" embodiment. In this example, a "global" interconnect is intended to include a crossbar interconnect or multi-region interconnect in connection with an on-chip" embodiment. In contrast, a "global" interconnect in an "off-chip", example, e.g., datacenter embodiment, can include multiple chips communicating via a crossbar that is built out of a set of "off-chip" switches and links. In this example, a "local" interconnect would include a connection within a "given" switch.

Also, while the present disclosure may reference high utilization endpoints and low utilization endpoints relative to a selectable bandwidth threshold in connection to a crossbar, or crossbar switch network, embodiments are not limited to a crossbar network. That is, embodiments of the present disclosure may be realized in non-crossbar networks with similar bandwidth properties, e.g. a fat-tree based network, etc. Indeed, the embodiments of the present disclosure provide flexibility in process placement and the migration capabilities described herein and can enrich and simplify the policies used to balance thermal, reliability/failure, and process variation induced non-uniform properties introduced in other types of heterogeneous networks.

Previous approaches to address non-uniform bandwidth usage in a crossbar network include proposals to use an additional global bus to accelerate heavily used input ports. However, such a solution only provides one additional bus at the global level, which has limited additional bandwidth and can be a scalability/power bottleneck, e.g., due to inefficiencies with bus-based global interconnects. Such an approach is also limited to on-chip crossbar networks and does not consider process placement and migration benefits, as accorded by the present disclosure.

Another previous approach includes using Field Programmable Gate Arrays (FPGAs) to reconfigure buffers and switches within a crossbar network. However, by adding FPGA reconfiguration capabilities into the crossbar network, these designs can incur additional area, timing and power overheads relative to a baseline crossbar network. An FPGA approach is also limited in the amount of extra bandwidth provided and its application scope is limited is to "on-chip" crossbars only. Embodiments of the present disclosure do not introduce these same area, timing, power overheads, and application limitations.

Figure 1B:
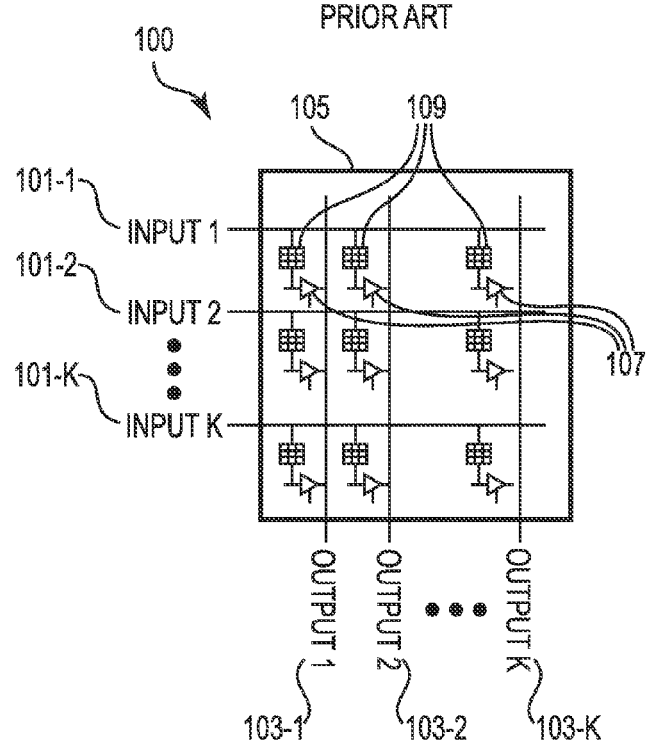

FIGS. 1A and 1B illustrate a baseline crossbar switch 100 according to the prior art. As shown in FIG. 1A, a number of inputs (e.g., first endpoints) 101-1, 101-2, . . . , 101-K are connected to a number of outputs (e.g., second endpoints) 103-1, 103-2, . . . , 103-K according to fixed paths through a crossbar switch 105 according to gating logic, e.g., gates 107, predetermined at design time.

FIG. 1B illustrates a similar baseline crossbar switch, according to the prior art, with the addition of buffers, e.g., 109, to buffer in-flight network packets between any two endpoints, e.g., 101-1, 101-2, . . . , 101-K and 103-1, 103-2, . . . , 103-K.

Figure 2:
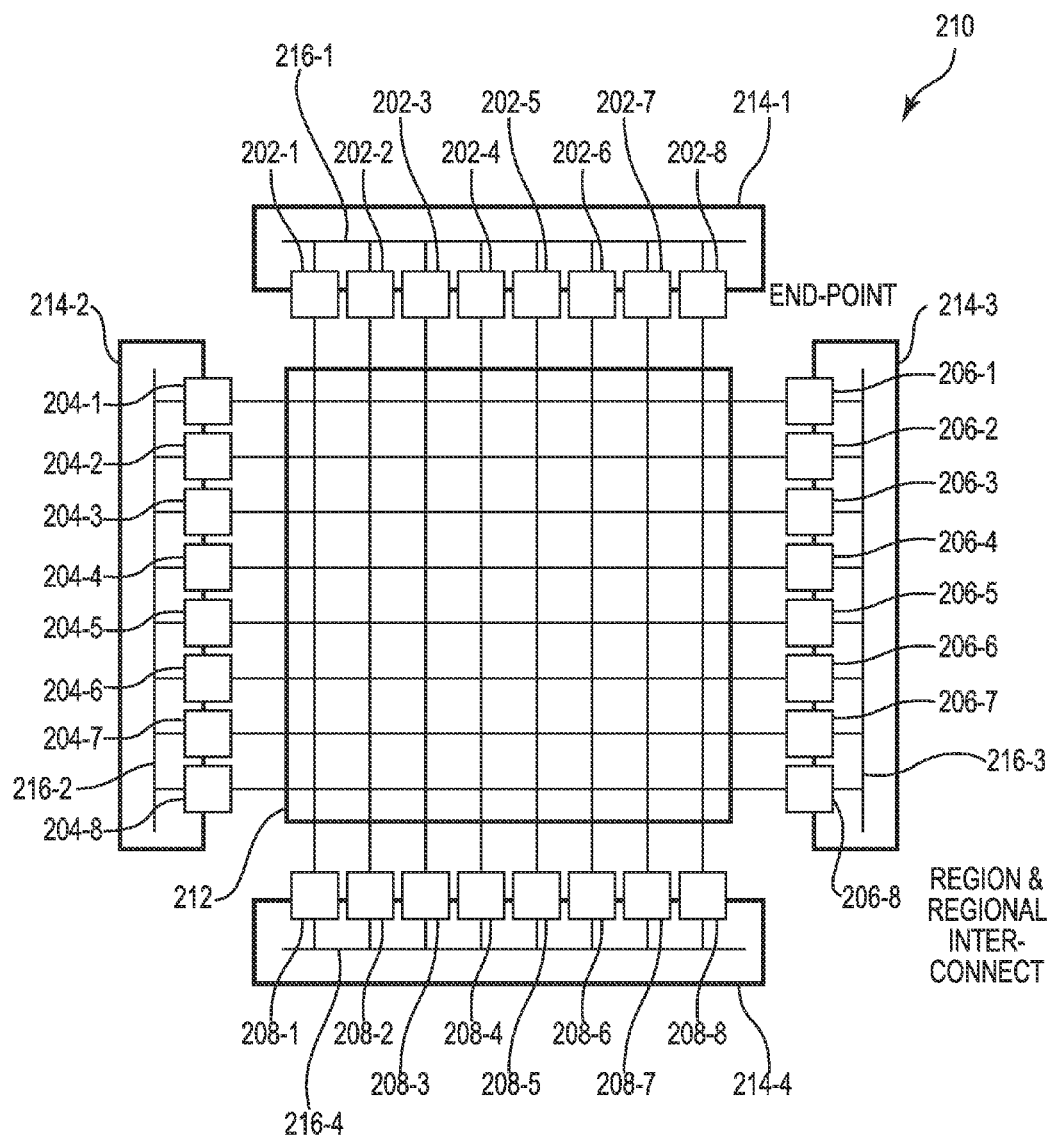
FIG. 2 is an example of a reconfigurable crossbar network according to an embodiment of the present disclosure.

FIG. 2 is an example of a reconfigurable crossbar network 210 according to an embodiment of the present disclosure. As shown in FIG. 2, a plurality of endpoints, e.g., 202-1, 202-2, . . . , 202-8, 204-1, 204-2, 204-8, 206-1, 206-2, . . . , 206-8, and 208-1, 208-2, . . . , 208-8, are connected to a crossbar 212 in the crossbar network. The crossbar 212 can include a network layout having one path, e.g., determined at design time for on-chip or at install for off-chip embodiments, between any two endpoints 202-1, 202-2, . . . , 202-8, 204-1, 204-2, . . . , 204-8, 206-1, 206-2, . . . , 206-8, and 208-1, 208-2, . . . , 208-8.

In the example shown in FIG. 2, thirty-two (32) sample block endpoints are shown connected to the crossbar 212. In this particular example, eight (8) endpoints 202-1, 202-2, . . . , 202-8 are shown grouped into a top region (e.g., first region) 214-1. Another eight (8) endpoints 204-1, 204-2, . . . , 204-8 are grouped into a left region (e.g., second region) 214-2. Another eight (8) endpoints 206-1, 206-2, . . . , 206-8 are grouped into a right region (e.g., third region) 214-3. And, another eight (8) endpoints 208-1, 208-2, . . . , 208-8 are grouped into a bottom region (e.g., fourth region) 214-4. While thirty-two (32) endpoints are shown in the example embodiment of FIG. 2, grouped into four (4) equal regions of eight (8) endpoints each, the same is only provided for ease of illustration. Embodiments are not limited to the number of endpoints, regions and/or to an equal number of endpoints in each region as given in this example.

The example embodiment shown FIG. 2 includes the addition of regional interconnects 216-1, 216-2, 216-3, and 216-4 provided to each region 214-1, 214-2, 214-3, and 214-4, respectively. A given regional interconnect 216-1, 216-2, 216-3, and 216-4 can be formed by placement of electrical traces according to photo-lithographic or circuit printing process techniques, for example. Embodiments, however, are not limited to photo-lithographic or circuit printing techniques.

In the example embodiment of FIG. 2, two different bandwidth thresholds may exist. One threshold is a bandwidth threshold between the crossbar and an endpoint, (e.g. a first threshold). Another threshold is a bandwidth threshold between an endpoint and another endpoint (e.g., a second threshold) within a same region, as connected by a regional interconnect, e.g., with the additional wiring and electrical traces there between.

The example embodiment given in FIG. 2 can be either an "on-chip" network, e.g., a Network-on-Chip (NoC), or an "off-chip" network, e.g., in a datacenter. In the embodiments implemented as "on-chip" the plurality of endpoints can be grouped into regions at design time, and the embodiments implemented as "off-chip" can be grouped into regions at install and wiring time, based on proximity, use and predicted interaction. Such "off-chip" networks can provide a crossbar-like network, e.g., where the crossbar is built out of a set of off-chip switches and links in a datacenter.

Figure 3A:
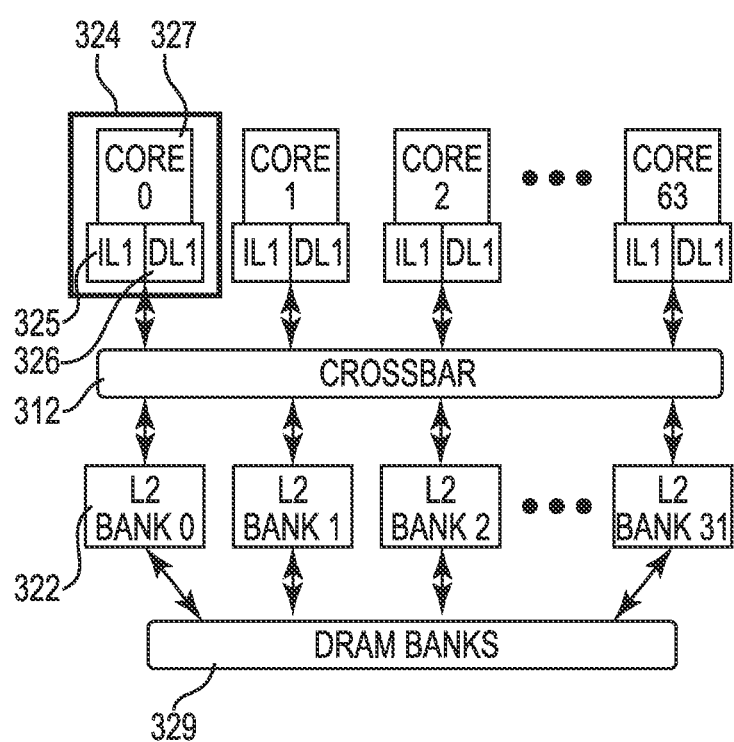

FIGS. 3A-3C illustrates in more detail an example embodiment of an "on-chip" based crossbar network according to the present disclosure. In the example embodiment of FIGS. 3A-3C, a sixty-four (64) core system is shown connected to a crossbar switch, e.g. a "swizzle-switch" as the same will be known and understood by one of ordinary skill in the art. Embodiments, however, are not so limited to a swizzle-switch crossbar or to a sixty-four (64) core size system.

FIG. 3A is an example block diagram illustrating an architecture in which a crossbar switch 312 can connect a number of core processor endpoints, e.g., endpoint 324, each including a core processor (Core 0) 327 and having an associated instruction level cache (IL1) 325 and an associated data level cache (DL1) 326. The crossbar switch is further connected to a number of cache bank endpoints, e.g., cache 322, and with associated dynamic random access memory (DRAM) banks 329. Again, embodiments are not limited to the example endpoints described with this example.

FIG. 3B illustrates an example embodiment of FIG. 3A in an "on-chip" circuit layout between endpoints and the crossbar switch. In the example shown in FIG. 3B the crossbar switch 312 is illustrated at center. The crossbar switch 312 is surrounded by sixty-four (64) processor cores 324. As shown in FIG. 3C, each processor core 324 may include an instruction level cache (ICACHE) 325 and a data level cache (DCACHE) 326.

In this example, the crossbar switch 312 is divided into eight (8) octants, e.g., eight (8) regions, of surrounding processor cores 324, eight (8) processor cores to each region. In this example the eight (8) octants of surrounding processor cores 324 are further surrounded by thirty-two (32) cache bank endpoints 322. A number of memory controllers 328 can be coupled to the cache bank endpoints 322 having executable instructions to control operation of the same.

For example, the octants are labeled as NW, NE, EN, ES, SE, SW, WS, and WN. Each octant is associated with eight processor cores 324 as illustrated by the lines coming out of the switch 312 (although not specifically designated by individual reference numerals for readability of FIG. 3B). Associated with octant WN are cache bank endpoints 322-1, 322-2, and 322-3. Associated with octant WS are cache bank endpoints 322-4, 322-5, 322-6, 322-7, and 322-8. Cache bank endpoints 322-1, 322-2, 322-3, and 322-4 are associated with memory controller 328-1, while cache bank endpoints 322-5, 322-6, 322-7, and 322-8 are associated with memory controller 328-2. Cache bank endpoints are generally designated herein by reference numeral 322 and memory controllers are generally designated herein by reference numeral 328. Examples are not limited to the specific associations of processor cores 324, cache bank endpoints 322, and memory controllers 328 described and illustrated herein.

Circuit traces at a micrometer scale, or smaller, may be formed to interconnect the crossbar switch 312 to the number of periphery endpoints, e.g., processor cores 324, cache bank endpoints 322, input/output (I/O) nodes and/or other endpoints, etc. According to embodiments, circuit traces are further formed to provide regional interconnects for each of the four (4) example regions, locally connecting the octants of surrounding processor cores 324.

Figure 4:
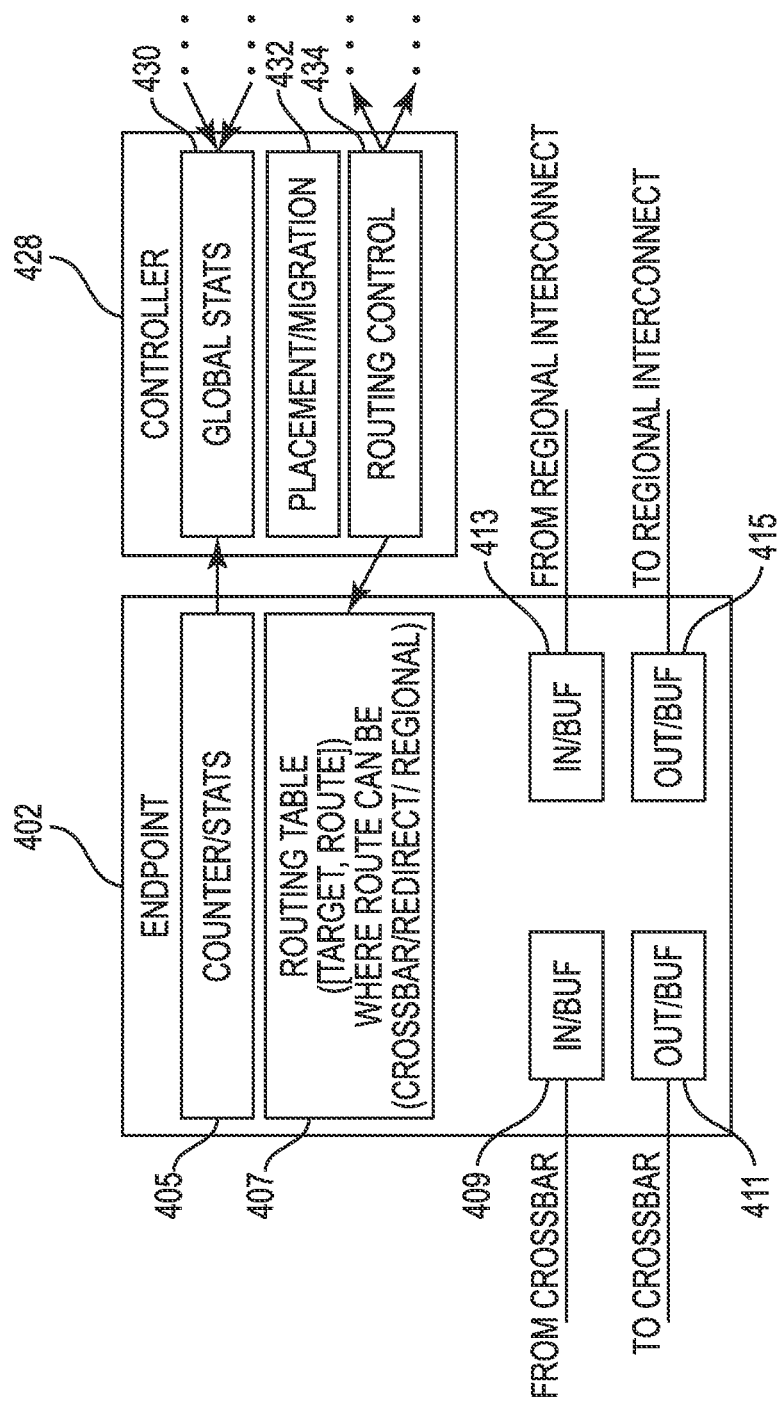
FIG. 4 illustrates an example endpoint structure and its interface with a controller according to an embodiment of the present disclosure.

FIG. 4 illustrates an example endpoint structure 402 and its communication interface with a controller 428. As shown in FIG. 4 an endpoint 402, e.g., a processor core (324 in FIGS. 3A-3C), cache bank (322 in FIGS. 3A-3C), an input/output node, etc., can include hardware to provide a counter 405 for tracking bandwidth usage statistics, and a routing table 407 including target and route information, where a route can include a crossbar route, a redirect route or a regional interconnect route.

Further as shown in the example embodiment of FIG. 4, each endpoint structure 402 can include hardware to provide an input port and associated buffer 409 "from" the crossbar, e.g., crossbar 312 shown in FIGS. 3A-3B, and an output port and associated buffer 411 "to" the crossbar. According to embodiments, each endpoint structure 402 can further include hardware to provide an input port and associated buffer 413 "from" a regional interconnect, e.g., 216-1, 216-2, etc., in FIG. 2, and an output port and associated buffer 415 "to" the regional interconnect.

As shown in the example embodiment of FIG. 4 the controller 428 can include hardware, e.g., logic in the form of an application specific integrated circuit (ASIC), and/or software, e.g., instructions stored in memory and executed by a processor to maintain network global bandwidth and operation statistics 430, endpoint operations placement and migration control 432, and routing control 434.

At runtime, the counter 405 for a given endpoint structure 402 (e.g., 202 in FIG. 2 and 322 and/or 324 in FIG. 3) can communicate bandwidth usage for the endpoint to the controller 428 to record and track global network usage by the various endpoints. For example, hardware counters 405 in a given endpoint structure can sample packet traffic between any pair of endpoints and send that sampling information to a hardware management node or to a software management module, e.g., global stats module 430 in FIG. 4, to evaluate and compare that sampling information with a bandwidth threshold. One bandwidth threshold (e.g., a first threshold) can include a predetermined available bandwidth between the endpoints and the crossbar switch. Another bandwidth threshold (e.g., a second threshold) can include a predetermined available bandwidth between endpoints in a same region as connected by a regional interconnect. Based on the comparison and evaluation a given endpoint can be characterized at run time relative to a given threshold as either a high utilization endpoint (e.g., elephant endpoint) or as a low utilization endpoint (e.g., ant endpoint) according to packet statistics. This characterization can be used as a prediction of future packet traffic between the two sampled endpoints.

According to embodiments, a defined policy can be accessed and implemented between any two endpoints based on their respective characterization. For example, a policy can be applied to a regional interconnect such that when two high utilization endpoint endpoints have a high-volume of communication with one another in a same region, but have little external communication, the two endpoints may be directed to exchange packet traffic with one another through their regional interconnect. In some cases, e.g., when the two high utilization endpoint endpoints in the same region do not need more bandwidth than what the regional interconnect provides, the two endpoints can even avoid using the crossbar switch to exchange packet traffic and instead entirely use the regional interconnect.

In operation, when a given endpoint is going to send a packet to another target endpoint, the endpoint can search its routing table 407 for the given target. If the target endpoint is located in the routing table 407, e.g. a "hit", and the target is regional, e.g., within the same region, then a policy, either implemented in hardware or in the form of instructions passed from the routing control module 434 of the controller 428, can be applied to send the packet over the regional interconnect. If the target endpoint is located in the routing table 407 and the pair of endpoints are in different regions and are active and high utilization endpoints, e.g., relative to a bandwidth threshold of the crossbar for packet traffic between the pair endpoints, a policy can be applied to add a header and redirect the packets via a low utilization endpoint (e.g., ant endpoint) within a same region as the high utilization endpoint for handling and forwarding to the target endpoint. Otherwise, if the target endpoint is located in the routing table 407 and the pair of endpoints are in different regions and are low utilization endpoints, e.g., relative to a bandwidth threshold of the crossbar for packet traffic between the pair of endpoints, the packet traffic can be sent over the crossbar.

Thus, according to embodiments, a low utilization endpoint can be configured to encapsulate a redirected packet with a unique header, e.g., "redirect header", indicating a true source endpoint and a true destination, e.g., target, endpoint. Likewise, a high utilization target endpoint can be configured to receive a redirected packet flow from a low utilization endpoint within a same region as the high utilization target endpoint from an endpoint in another region.

In this manner, unused bandwidth can be allocated from communication-light endpoints (e.g., "ants") to communication-heavy endpoints (e.g., "elephants"). That is, a high-bandwidth regional interconnect may first transfer packets of a source high utilization endpoint to its neighboring low utilization endpoints which, on behalf of the source high utilization endpoint, forward the packets to the neighboring low utilization endpoints of the target high utilization endpoint. Hence, the area and power efficiency of the regional interconnects can provide a much higher endpoint bandwidth to a maximum of aggregated regional interconnect bandwidth.

In at least one embodiment, when getting a packet from the crossbar, e.g., 212 in FIG. 2, 312 in FIGS. 3A-3B, the hardware of a given endpoint 402 check to see if the packet has a redirect header. If the packet has a redirect header the hardware can move the packet to an associated host, e.g., processor core, cache, input/output node, etc., if a final target address in the redirect header matches an address of the recipient endpoint. If the final target address in the redirect header does not match an address of the recipient endpoint, the hardware can redirect the packet over a regional interconnect to the correct recipient endpoint. If a given packet does not have a redirect header, the hardware moves the packet to the host associated with the recipient endpoint.

As a further example, when getting a packet from a regional interconnect, e.g., 216-1, 216-2, etc., in FIG. 2, the hardware of a given endpoint 402 check to see if the packet has a redirect header. If the packet has a redirect header the hardware can move the packet to an associated host, e.g., processor core, cache, input/output node, etc., if a final target address in the redirect header matches an address of the recipient endpoint. If the final target address in the redirect header does not match an address of the recipient endpoint, the hardware can move the packet to an output buffer 411 to the crossbar to redirect the packet over the crossbar to the correct recipient endpoint. If a given packet does not have a redirect header, the hardware moves the packet to the host associated with the recipient endpoint.

Figure 5:
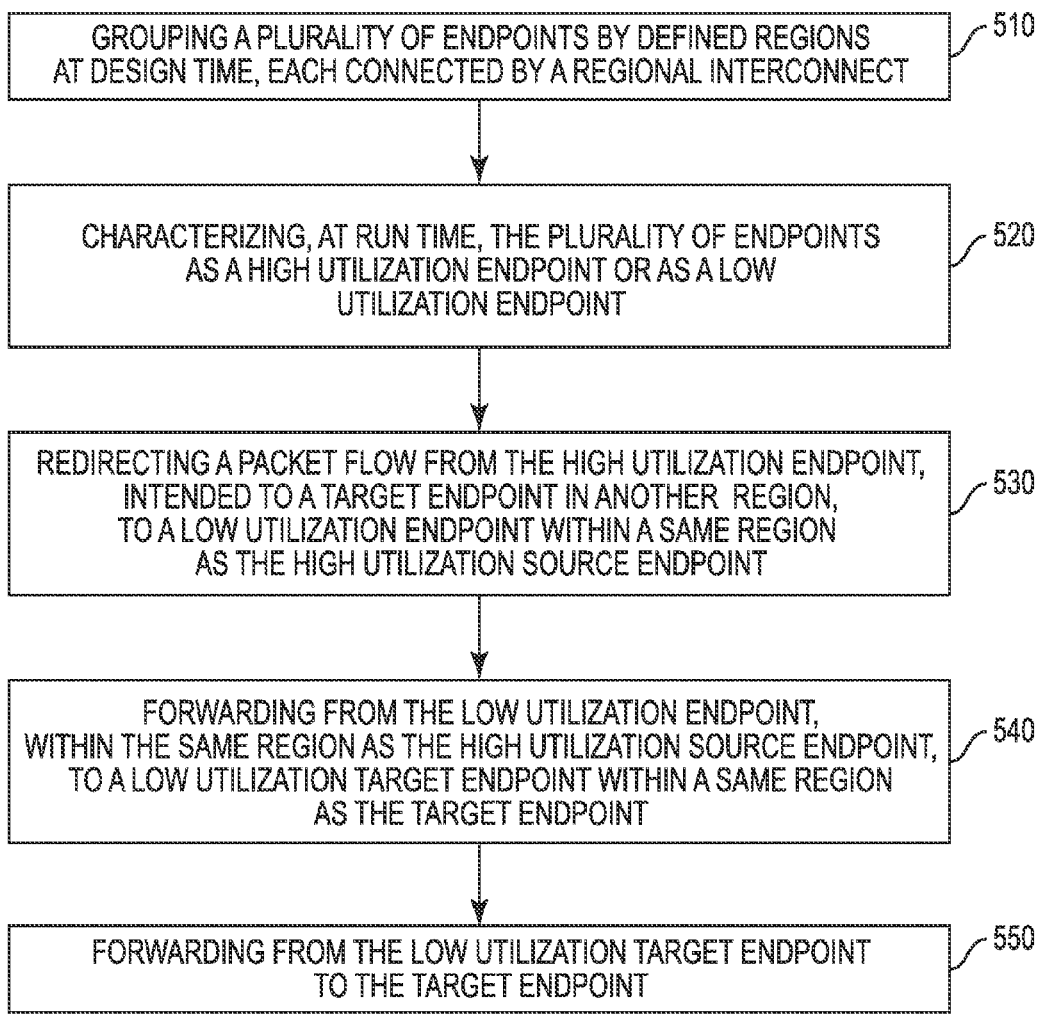
FIG. 5 is a block diagram illustrating an example method according to an embodiment of the present disclosure.

FIG. 5 is a block diagram illustrating an example method according to an embodiment of the present disclosure. In the example of FIG. 5 the method includes grouping a plurality of endpoints, connected to a crossbar, by defined regions at design time as shown at 510. Each endpoint within a defined region is connected by a regional interconnect. The plurality of endpoints may be grouped based on proximity, usage and predicted interaction.

At 520, the method includes characterizing, at run time, each of the plurality of endpoints as a high utilization endpoint or as a low utilization endpoint, e.g., "elephant" endpoint or "ant" endpoint. In one example, each of the plurality of endpoints can be characterized as a high utilization endpoint or as a low utilization endpoint based on using hardware counters, 405 in FIG. 4, to sample packet traffic between any pair of endpoints connected to the crossbar. The sampled packet traffic can be communicated to a controller, 428 in FIG. 4, and compared to a threshold, e.g., a predetermined endpoint to crossbar bandwidth threshold (first threshold) and/or endpoint to endpoint available bandwidth threshold (second threshold) in a given region.

At 530, the method includes redirecting packets from a high utilization source endpoint, intended to a target endpoint in another region, to a low utilization source endpoint within a same region as the high utilization source endpoint. At block 540, the method includes forwarding the packets from the low utilization source endpoint, within the same region as the high utilization source endpoint, to a low utilization target endpoint within a same region as the target endpoint.

At block 550, the method includes forwarding from the packets low utilization target endpoint to the target endpoint. As described above, the packets can be redirected and forwarded using the hardware of a routing table, 407 in FIG. 4, and/or instructions from a routing control module, 434 in FIG. 4, and by using additional input/output ports and buffers connecting from and to a regional interconnect, 413 and 415. When redirecting and forwarding the packets, the method includes encapsulating the packets with a unique redirect header indicating a true source endpoint and a true destination.

In at least one example embodiment, a set of operations associated with an endpoint can be migrated to a common region or to a different region. That is, in the case where multiple high utilization endpoints are competing for shared regional interconnect bandwidth, e.g., based on a global communication pattern and resource availability, these high utilization endpoints can either be migrated apart to different regions, each providing sufficient bandwidth to local high utilization endpoints or migrated to a common region to share a regional interconnect and local caches.

For example, instructions associated with a placement and migration module, 432 in FIG. 4, can be executed to stop a program running on one endpoint, save its state to memory, move and then continue running the program, e.g., restoring its state, on another endpoint. In this example the method includes migrating apart a high utilization endpoint to a different region from a high utilization endpoint in the same region when a bandwidth of the high utilization endpoint is greater than an available bandwidth of a regional interconnect for the region.

In another example, this method includes executing instructions to migrate a set of operations, between a high utilization source endpoint in a first region and a high utilization target endpoint in a second region, to a pair of low utilization endpoint in a same region to utilize a regional interconnect between the low utilization endpoints. That is, where multiple high utilization nodes are competing for a shared regional interconnects within their respective regions, based on a global communication pattern and regional interconnect bandwidth availability, the high utilization endpoints may be migrated together in a different region. According to embodiments, instructions can further be executed, e.g. by controller 428, to power gate each regional interconnect when no extra bandwidth or reconfiguration, e.g., migration, is needed. Such placement and migration policies can be accommodated due to the flexibility of the regional interconnects introduced by the present disclosure.

The regional interconnects described herein may be able to provide a much higher per-port bandwidth than crossbar network alone can provide to endpoints to better accommodate a subset of region neighboring endpoints. Each endpoint can be connected to its regional interconnect with high-bandwidth ports, which can spread its input/output packets to other endpoints connected to the same regional interconnect. The neighboring endpoints can then forward packets on behalf of high utilization endpoints and better utilize the crossbar-like network. The forwarded packets will be encapsulated with particular bits in their header, e.g., indicating "true" source and destination endpoints.

Depending on the packet delivery ordering property of the crossbar-like network, the endpoints may include additional buffers to reorder their received packets and some packets may have a few additional hops through regional interconnects. However, the embodiments allow policies to share bandwidth across endpoints, e.g., nodes, in a same region and mechanisms to forward packets on behalf of communication heavy nodes up to a maximum of an aggregated regional interconnect bus bandwidth. Such placement and migration policies can also consider the dynamic changes in not only bandwidth utilization, but also communication, thermal, reliability and process variation induced heterogeneity, e.g., differences. Dividing endpoints into regions at design time allows for adding low-cost, high bandwidth regional interconnects to a crossbar or fat-tree like network, while avoiding the high power, area and timing over-heads associated with global interconnects and additional field programmable gate arrays (FPGAs), and avoids having to over-provision crossbar networks.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

What is claimed:

1. A reconfigurable crossbar network, comprising:
    a crossbar;
    a plurality of endpoints coupled to the crossbar, wherein the plurality of endpoints are grouped into regions at design time of the crossbar network, and wherein:
        each of the plurality of endpoints is categorized as either a high utilization endpoint or a low utilization endpoint, wherein a high utilization endpoint is an endpoint having a bandwidth usage exceeding a bandwidth threshold of the crossbar and a low utilization endpoint is an endpoint having a bandwidth usage below the bandwidth threshold of the crossbar; and
        the low utilization endpoint is configured to encapsulate a redirected packet from a high utilization endpoint with a redirect header indicating a true source endpoint and a true destination endpoint; and
    a plurality of regional interconnects, wherein each regional interconnect connects a group of endpoints within a given region.

2. The network of claim 1, wherein each of the plurality of endpoints is characterized as either a high utilization endpoint or a low utilization endpoint at run time according to the bandwidth threshold and packet statistics.

3. The network of claim 1, wherein a high utilization source endpoint redirect packet flow, intended to a target endpoint in another region, to a low utilization endpoint within a same region as the high utilization source endpoint for handling and forwarding to the target endpoint.

4. The network of claim 3, wherein:
    the high utilization target endpoint is configured to receive the redirected packet flow from a low utilization endpoint within a same region as the high utilization target endpoint from an endpoint in another region.

5. The network of claim 1, wherein an endpoint within the given region exchanges packets with an endpoint within a same region through the regional interconnect without utilizing the crossbar switch.

6. The network of claim 3, wherein the network is configured to migrate a set of operations, between a high utilization source endpoint in a first region and a high utilization target endpoint in a second region, to a pair of endpoints in a same region in order to use the regional interconnect of the second region without utilizing the crossbar switch.

7. The network of claim 3, wherein the network is configured to migrate a set of operations for at least one of two high utilization endpoints in a first region to a low utilization endpoint in a second region when a bandwidth usage of the at least one of two high utilization endpoints is higher than an available bandwidth in a regional interconnect for the first region.

8. The network of claim 1, wherein:
    the plurality of endpoints are grouped into regions, at design time, based on proximity, use and predicted interaction;
    wherein the network is a crossbar-like network; and
    wherein the crossbar is built out of a set of off-chip switches and links in a datacenter.

9. The network of claim 1, wherein each regional interconnect is configured to be power gated when no extra bandwidth or reconfiguration is required.

10. A method for reconfiguring a crossbar network, comprising:
    grouping a plurality of endpoints, connected to a crossbar, by defined regions at design time, wherein endpoints within each region are connected by a regional interconnect;
    characterizing, at run time, each of the plurality of endpoints as a high utilization endpoint or as a low utilization endpoint, wherein a high utilization endpoint is an endpoint having a bandwidth usage exceeding a bandwidth threshold of the crossbar and a low utilization endpoint is an endpoint having a bandwidth usage below the bandwidth threshold of the crossbar;
    redirecting a packet flow from a high utilization source endpoint, intended to a target endpoint in another region, to a low utilization source endpoint within a same region as the high utilization source endpoint;
    forwarding from the low utilization source endpoint, within the same region as the high utilization source endpoint, to a low utilization target endpoint within a same region as the target endpoint;
    forwarding from the low utilization target endpoint to the target endpoint; and
    encapsulating, at the low utilization source endpoint within the same region as the high utilization source endpoint, a redirected packet from the high utilization source endpoint, with a redirect header indicating a true source endpoint and a true destination endpoint.

11. The method of claim 10, wherein the method includes migrating apart a high utilization endpoint to a different region from a high utilization endpoint in the same region when a bandwidth of the high utilization endpoint is greater than an available bandwidth of a regional interconnect for the region.

12. The method of claim 11, wherein the method includes migrating a set of operations, between a high utilization source endpoint in a first region and a high utilization target endpoint in a second region, to a pair of endpoints in a same region to utilize a regional interconnect between the low utilization endpoints.

13. The method of claim 12, wherein computer executable instructions are executed by a processor to migrate endpoint operations between endpoints based on the defined regions and the regional interconnects according to communication, thermal, reliability and process variation introduced heterogeneity.

14. An on-chip reconfigurable crossbar network, comprising:

an on-chip crossbar switch; and
a plurality of endpoints coupled to the on-chip crossbar switch, wherein the plurality of endpoints are grouped into regions at design time of the on-chip crossbar switch based on proximity, use and predicted interaction, and wherein each of the plurality of endpoints are characterized at run time according to a bandwidth threshold of the crossbar as a high utilization endpoint or as a low utilization endpoint according to packet statistics;
a plurality of regional interconnects, wherein each regional interconnect connects a group of endpoints within a given region;
wherein a high utilization endpoint within a region redirects packets to another endpoint within the region for handling and forwarding to a target endpoint in a different region and a low utilization endpoint within the same region as the high utilization endpoint encapsulates a redirected packet from the high utilization endpoint with a redirect header indicating a true source endpoint and a true destination endpoint; and
wherein a set of operations associated with an endpoint are migrated to a common region or a different region.

* * * * *